(12) United States Patent
Gao et al.

(10) Patent No.: US 7,249,154 B2
(45) Date of Patent: Jul. 24, 2007

(54) METHOD AND APPARATUS FOR PRODUCING AN EXPONENTIAL SIGNAL

(75) Inventors: Feng Gao, Fort Collins, CO (US); Patrick H. Adams, III, Loveland, CO (US); David P. Kjosness, Longmont, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 730 days.

(21) Appl. No.: 10/685,317

(22) Filed: Oct. 14, 2003

(65) Prior Publication Data

US 2005/0080830 A1 Apr. 14, 2005

(51) Int. Cl.
*G06F 1/02* (2006.01)

(52) U.S. Cl. .................................... 708/277

(58) Field of Classification Search ............... 708/277, 708/606
See application file for complete search history.

(56) References Cited

U.S. PATENT DOCUMENTS

| | | | | |
|---|---|---|---|---|
| 5,195,052 A | * | 3/1993 | Karim ........................ | 708/606 |
| 6,317,769 B1 | * | 11/2001 | Kobayashi et al. ......... | 708/491 |
| 6,567,832 B1 | * | 5/2003 | Ono et al. .................. | 708/606 |
| 6,748,412 B2 | * | 6/2004 | Ruehle ....................... | 708/606 |
| 2004/0236813 A1 | * | 11/2004 | Grinchuk .................... | 708/492 |

* cited by examiner

*Primary Examiner*—Chuong D. Ngo

(57) ABSTRACT

An exponential signal generator having a memory, a scale unit and an adder. A value stored in the memory is scaled and added to itself to produce a new value for storing in the memory. The exponential signal is represented by the exponential value.

25 Claims, 9 Drawing Sheets

US 7,249,154 B2

METHOD AND APPARATUS FOR PRODUCING AN EXPONENTIAL SIGNAL

FIELD OF THE INVENTION

This invention relates generally to the field of signal generation. More particularly, this invention relates to a method for generating a signal that changes exponentially with time.

BACKGROUND

Signal sources are a common form of test equipment used in many areas, including the testing of electronic equipment, dynamic structures and audio equipment. One category of test equipment includes sweep generators. Sweep generators are designed to generate a signal (such as a sinusoidal, square, triangular or saw-tooth waves) whose frequency varies in a prescribed manner with respect to time. A common form of sweep is a linear sweep, where the instantaneous frequency increases by a fixed amount per time unit. Another form of sweep is an exponential sweep, in which the frequency increases or decreases exponentially with time. Such as sweep is generated by a "logarithmic sweep generator", so called because the logarithm of frequency varies linearly with time.

Sweeps are usually described by a set of 'sweep parameters', such as the initial and final frequency values and the duration of the sweep.

One form of logarithmic sweep generator uses an analog circuit to produce an exponentially increasing or decreasing voltage, which is then applied to a voltage-controlled oscillator to produce a signal with an exponentially increasing frequency. This approach is limited because of the difficulties in producing circuits that can cover extreme variations of sweep parameters. In addition, the approach is incompatible with digital signal generation techniques, such as fractional-N PLL or Direct Digital Synthesis (DDS).

Another approach stores a list of frequency values in a memory to provide a look-up table. The values are retrieved during a sweep to provide the desired frequency profile. Disadvantages of this method include the size of the memory required for long sweeps with high-resolution steps and the amount of time required for loading the table when the sweep parameters are changed.

A still further approach uses a high-speed processor to compute each new frequency step and updates the frequency at fixed time intervals. This requires large computation power when high resolution (32-bit of higher, for example) frequencies or high step rates are required.

OVERVIEW OF CERTAIN EMBODIMENTS

The present invention relates generally to a method and apparatus generator for generating a signal that varies exponentially with time. Objects and features of the invention will become apparent to those of ordinary skill in the art upon consideration of the following detailed description of the invention.

In accordance with certain aspects of the invention, an exponential signal generator is provided having a memory, a scale unit and an adder. A value stored in the memory is scaled and added to itself to produce a new value for storing in the memory. The exponential signal is represented by the exponential value.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
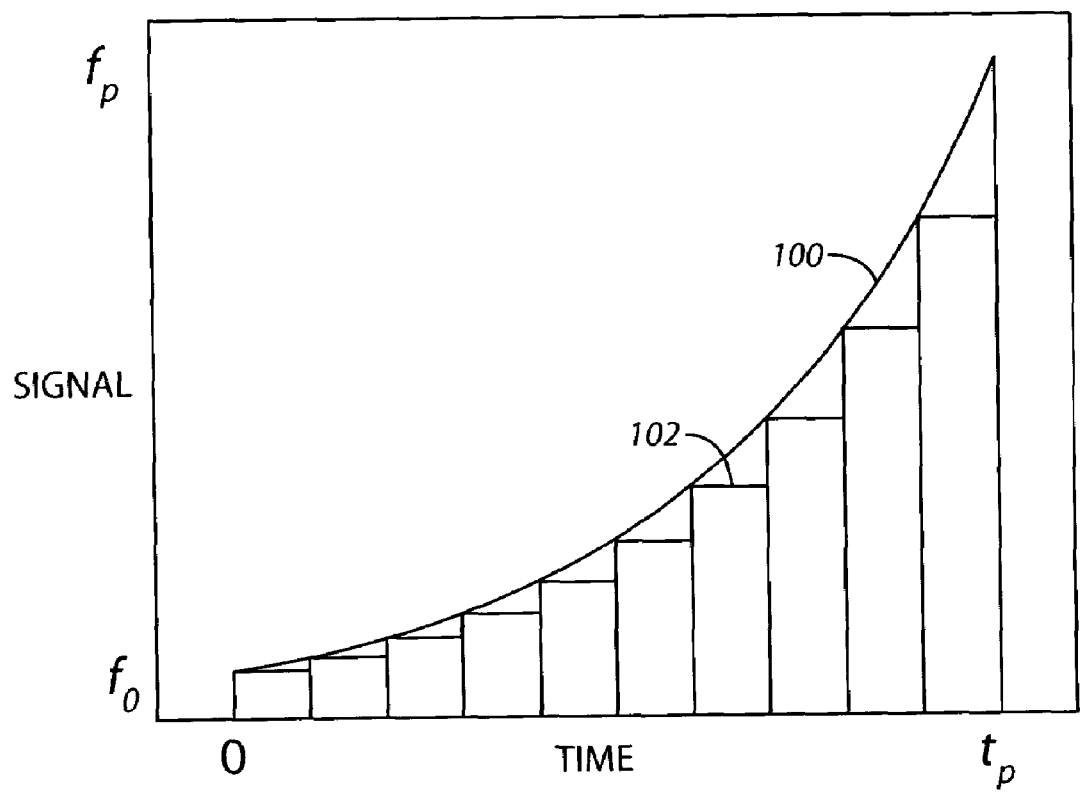
FIG. 1 is a graph of an exemplary exponential signal generated in accordance with certain aspects of the present invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

The present invention relates generally to a method and apparatus for generating a signal having an exponential time-dependence. One application of the invention is in providing a control signal for controlling a logarithmic sweep generator. In this application, the exponential signal is indicative of the instantaneous frequency of the test signal. In the sequel, the exponential signal will also be referred to as a frequency signal, however, it is to be understood that an exponential signal generator has a variety of other uses.

In a logarithmic sweep signal, the instantaneous frequency at time t of a signal with an exponentially swept signal is given by $$f(t) = \alpha^t f_0, \quad (1)$$

where $f_0$ is the initial or start frequency and $\alpha$ is a parameter that is related to the rate of the sweep. This is commonly called a logarithmic sweep since the logarithm of the frequency is proportional to time, i.e. $\log(f(t)) = t.\log(\alpha) + \log(f_0)$. The final or stop frequency is denoted by $f_p$ and the duration of the sweep is denoted by $t_p$. At time $t = t_p$, the values are related by $$f_p = \alpha^{t_p} f_0, \quad (2)$$

so $\alpha$ has the value $$\alpha = \left(\frac{f_p}{f_0}\right)^{\frac{1}{t_p}}, \quad (3)$$

Replacing $\alpha$ in equation 1, gives the frequency in terms of the sweep parameters, namely $$f(t) = f_0 \left(\frac{f_p}{f_0}\right)^{\frac{t}{t_p}}. \quad (4)$$

FIG. 1 is a graph of an exemplary exponential signal generated in accordance with certain aspects of the present invention. The signal is shown as a function of time. Curve 100 shows an exponential signal swept from the value $f_0$ to the value $f_p$ over a time $t_p$. In FIG. 1, $\alpha$ is greater than one and the signal increases with time. When $\alpha$ is less than one, the signal will decrease with time.

From equation 4, a relationship between the signal at time t and time t+T can be found, namely, $$f(t+T) = f_0 \left(\frac{f_p}{f_0}\right)^{\frac{t+T}{t_p}} \quad (5)$$

$$= f_0 \left(\frac{f_p}{f_0}\right)^{\frac{t}{t_p}} \left(\frac{f_p}{f_0}\right)^{\frac{T}{t_p}}$$

$$= \left(\frac{f_p}{f_0}\right)^{\frac{T}{t_p}} \cdot f(t),$$

where T is the duration of a small time interval or time step. From this equation it can be seen that the value of the signal at time t+T is proportional to the value at time t. Writing $t_i = i.T$ allows equation 5 to be written as the discrete recurrence relation $$f(t_0) = f_0 \quad (6)$$
$$f(t_{i+1}) = f(t_i) + k \cdot f(t_i), \quad i = 1, 2, \ldots p-1$$
where $$k = \left(\frac{f_p}{f_0}\right)^{\frac{T}{t_p}} - 1 \quad (7)$$

is a scale factor. The scale factor may be approximated by one or more terms from the series expansion $$k = \beta + \frac{\beta^2}{2!} + \frac{\beta^3}{3!} + \ldots, \text{ where } \beta = \frac{T}{t_p} \ln\left(\frac{f_p}{f_0}\right).$$

For an exponentially increasing signal, k is positive, while for an exponentially decreasing signal k is negative. Hence, the signal at time $t_{i+1}$ can be obtained from the signal at time $t_i$ by adding a fraction k of the signal at time $t_i$. Referring again to FIG. 1, curve 102 shows a discrete approximation to the exponential. The number of steps in the curve is usually much higher in practice, but a small number of steps have been depicted in the figure for clarity.

The duration T of the time step determines the rate of operation 1/T or sample rate of the exponential signal generator.

Figure 2:
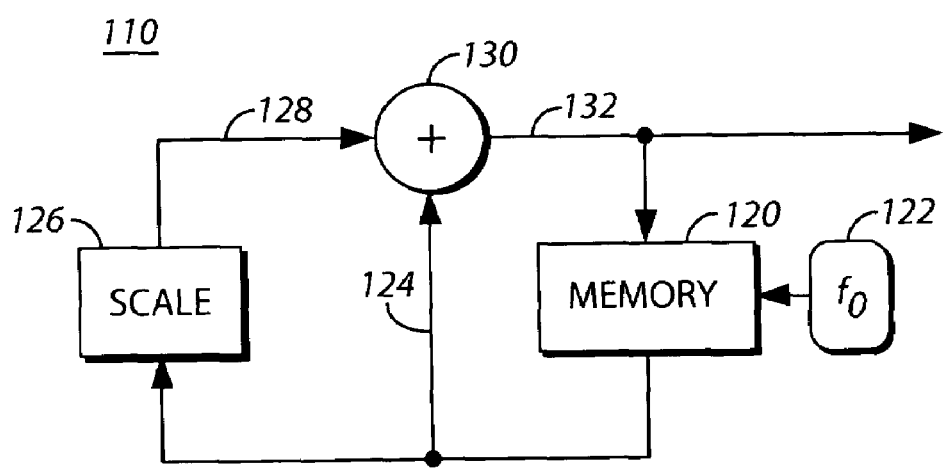
FIG. 2 is a functional diagram of an exponential signal generator in accordance with certain aspects of the present invention.

FIG. 2 is a functional block diagram of exponential signal generator that operates in accordance with equation 6. In FIG. 2, a memory unit 120 stores the signal $f(t_i)$. Initially, the value $f_0$ (122) is stored in memory unit 120. In each time step, the signal $f(t_i)$ (124) is scaled by a factor k in scale unit 126 to produce scaled signal 128. The scaled signal $kf(t_i)$ is also referred to as an increment signal, since it is added to the signal 124 in adder 130 to produce the next exponential signal $f(t_{i+1})$ (132). The signal 132 is then stored in memory unit 120, replacing the previous value in the memory unit.

In one embodiment of the invention, the recurrence relation in equation 6 is implemented by selecting the sweep parameters $f_0$, $f_p$ and $t_p$ and the time step T and calculating the value of the multiplier k (or, equivalently, the multiplication factor 1+k). In this implementation, the scale unit 126 in FIG. 2 is a multiplier.

In an alternative embodiment, the value of k is chosen so that $$k = \pm 2^{-S}, \quad (8)$$

where S is an integer. This choice allows the scale unit 126 to be implemented as a shifter (or, if k is negative, as a shifter and an inverter), which is simpler to implement than a multiplier. To permit this choice, the time step is chosen so that $$T = t_p \cdot \frac{\ln(1 \pm 2^{-S})}{\ln(f_p) - \ln(f_0)}, \quad (9)$$

The plus sign is used when $f_p > f_0$, otherwise the minus sign is used. This ensures that the time step T is positive.

In a still further embodiment, additional shifters are added. In general, the multiplier k can be written as a sum of shifts, namely $$k = \pm 2^{-S} \sum_{m=0}^{M-1} b_m 2^{-m}, \quad (10)$$

where $b_m$ is equal to zero or one. The multiplication by k can be implemented using one shifter for each non-zero $b_m$.

The parameter $N_{sweep} = t_p/T$ denotes the number of time steps per sweep. When implemented in a digital circuit have a system clock, the parameter $N_{clock} = T/T_{clock}$ is used to denote the number of clock cycles per time step, where $T_{clock}$ is the period of the system clock. In such an implementation, the time step $T=N_{clock} \cdot T_{clock}$ is a discrete variable. In this case a search may be made for the values of S and T that best approximate the desired sweep.

A pseudo code description of an exemplary method is given below.

```
count_1 = N_sweep          // number of points left in sweep
count_2 = N_clock          // number of clock cycles left in period
f = f_0                    // start frequency
while count_1 > 0          // while sweep not finished
    while count_2 > 0      // period not elapsed
        count_2 = count_2 - 1  // decrement clock counter
        if count_2 = 0     // end of period
            f = f + k * f  // update frequency
            count_1 = count_1 - 1  // decrement point counter
        endif
    end while
    count_2 = N_clock      // reset clock counter
end while
```

Figure 3:
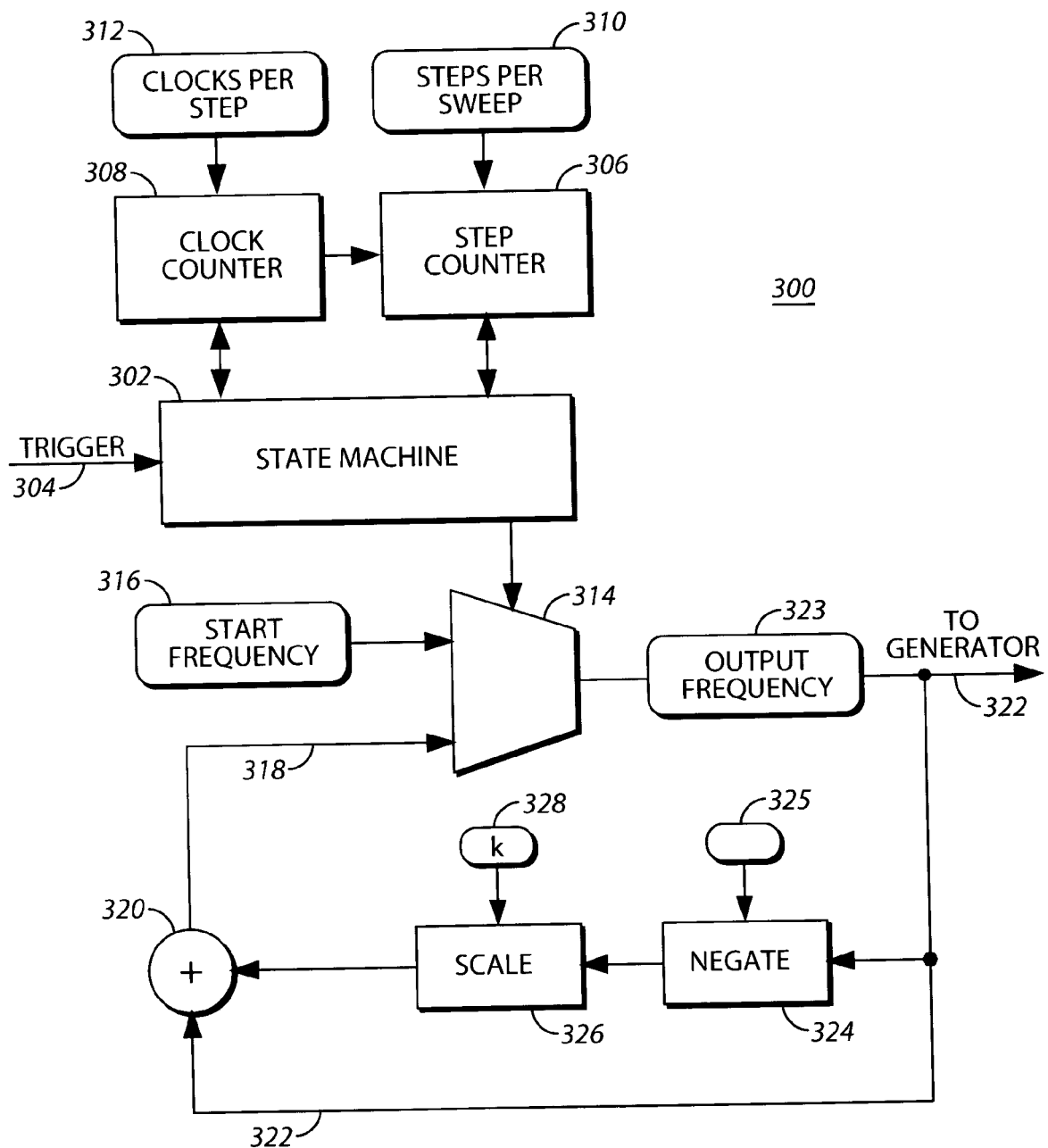
FIG. 3 is a diagrammatic representation of an exponential signal generator in accordance with certain aspects of the present invention.

An exemplary embodiment of an exponential signal generator 300 that operates according to the method described above is shown in FIG. 3. Referring to FIG. 3, the exponential signal generator 300 is controlled by a state machine 302. The operation of the state machine 302 is initiated by trigger 304. The state machine 302 is responsive to two counters, a step counter 306, denoted by count_1 in the pseudo code above, and clock counter 308, denoted by count_2 in the pseudo code above. The initial values of the clocks are set from the values in memory circuits 310 and 312 respectively. Memory circuit 310 holds the value $N_{sweep}=t_p/T$, while memory circuit 312 holds the value $N_{clock}=T/T_{clock}$. The memory circuits may be registers, for example. The state machine controls the operation of multiplexer 314. At the beginning of a signal sweep, the multiplexer 314 is configured to select the start value $f_0$, from memory 316. Thereafter, the multiplexer is configured to select the output 318 from adder 320. The output from the multiplexer 314 is stored in memory 323 and provides the current output signal 322, which may, for example, be passed to a signal generator to control the frequency of a test signal. Whenever the clock counter 308 expires, the output signal 322 is passed to 2's complement inverter 324. The inverter either negates or passes the signal dependent upon a control value stored in memory 325. The resulting signal is passed to scale unit 326. The inverter 324 only negates the signal when the sweep decreases with time (i.e. when k is negative). In one embodiment of the system, the scale unit 326 is a multiplier, which multiples the signal by the value k. In this embodiment, the inverter may not be required. In a further embodiment of the system, the scale unit is a shifter. In this embodiment the scale factor is $k=\pm 2^{-S}$ and the scaling is achieved by shifting the signal down by S binary places. The output from the scale unit is added to the signal in adder 320, to provide the next signal 318. When the step counter 306 expires, the state machine 302 halts the operation of the system. The exponential signal generator 300 may be implemented, for example, on a programmable gate array. The memories may be implemented as registers.

Figure 4:
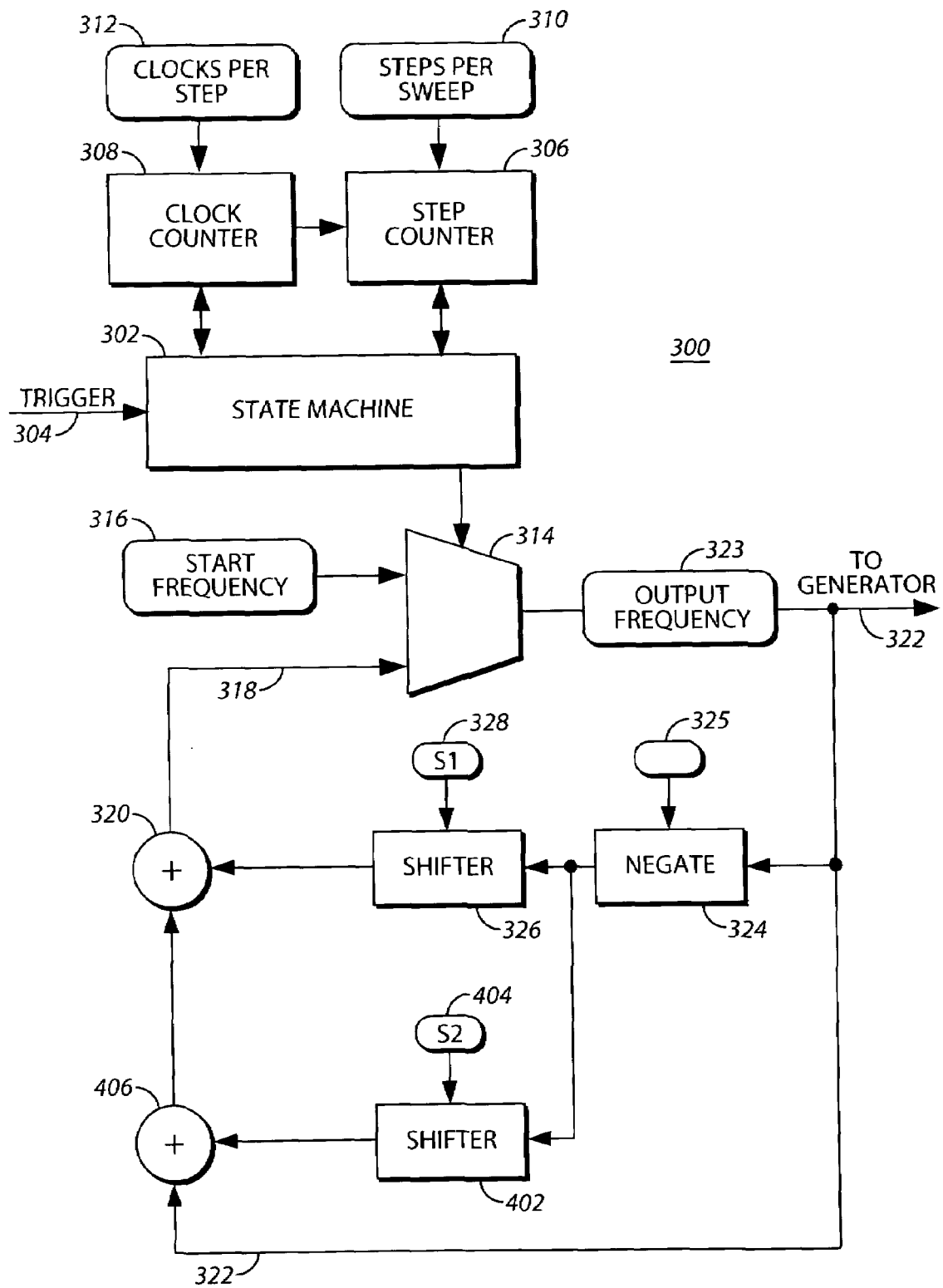
FIG. 4 is a diagrammatic representation of an exponential signal generator in accordance with certain aspects of the present invention.

A further embodiment of exponential signal generator 300 is shown in FIG. 4. In FIG. 4, the scale unit 326 is implemented as two shifters: a first shifter 326 with shift value S1 and a second shifter 402 is placed in parallel with the first shifter. The second shifter has a shift value 52, stored in memory circuit 404. The output from the second shifter is added to the signal 322 in a second adder 406 and the result is added to the output of the first shifter in adder 320. Additional shifters may be incorporated. The shifters may be arranged in parallel (as in FIG. 4) or in series.

Figure 5:
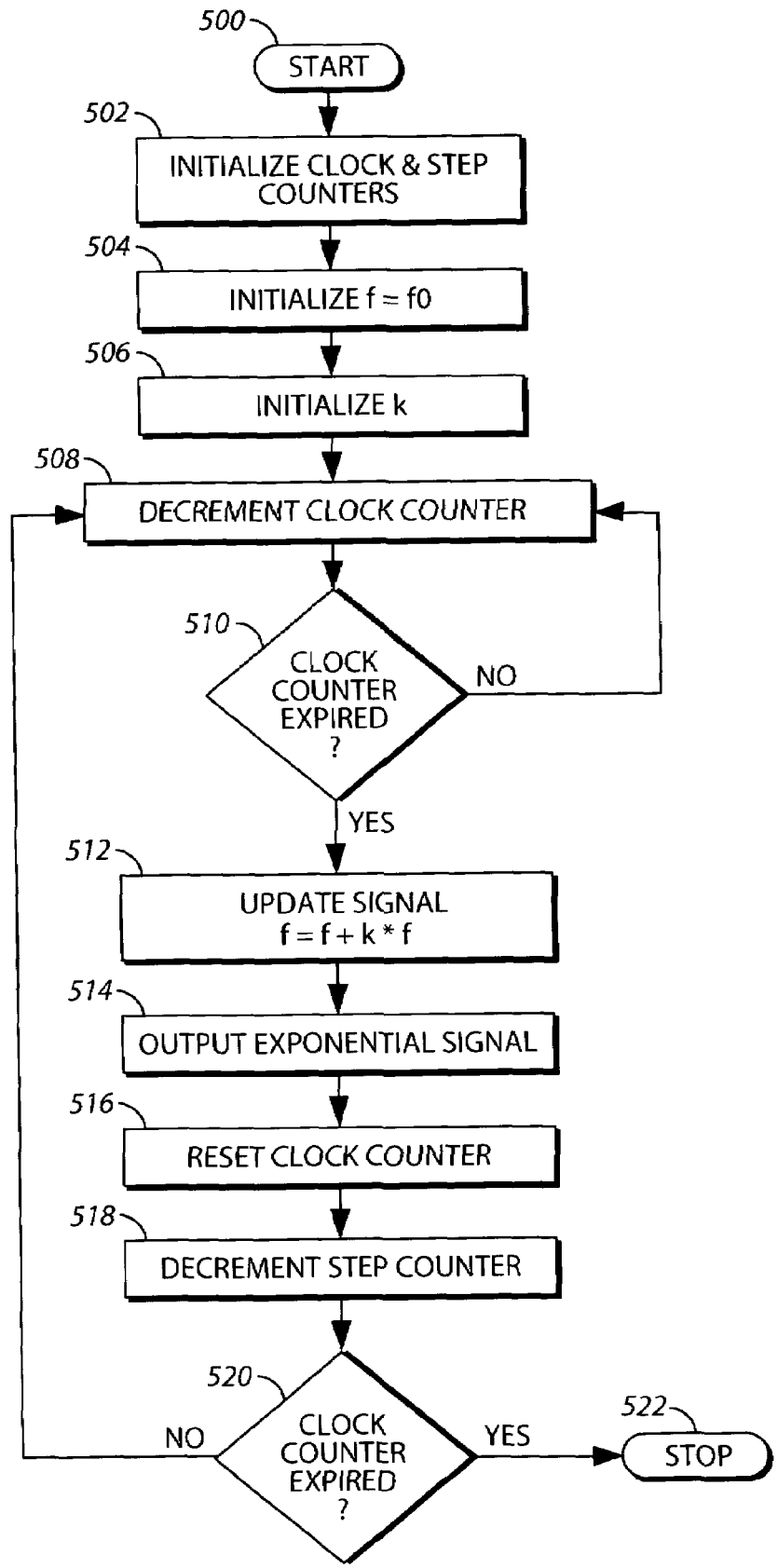
FIG. 5 is a flow chart of a method for generating an exponential signal in accordance with certain aspects of the present invention.

FIG. 5 is a flow chart of a method for generating an exponential signal. Following start block 500, the clock and step counters are initialized at block 502. The start value $f_0$ and the scale factor k are initialized at blocks 504 and 506 respectively. At each clock cycle, the clock counter is decremented at block 508. Equivalent counting methods, such as increasing a counter value, may of course be used. At decision block 510 a check is made to determine if the clock counter has expired, indicating that a period of time T has elapsed. If the clock counter has not expired, as indicated by the negative branch from decision block 510, flow returns to block 508 and the counter is decremented again at the next clock cycle. If the clock counter has expired, as indicated by the positive branch from decision block 510, the signal is updated at block 512 and output to a signal generator at block 514. The clock counter is then reset at block 516 to indicate the start of a new period, and the step counter is decremented at block 518 to indicate that another signal value has been generated. At decision block 520, a check is made to determine if the step counter has expired. If not, as indicated by the negative branch from decision block 520, flow returns to block 508. If the step counter has expired, as indicated by the positive branch from decision block 520, the signal sweep is complete and the process terminates at block 522.

In a further embodiment, the change to the current signal may be implemented in a number of equal steps. This allows the multiplier or shifter to operate at a lower rate for a given level of accuracy. If the current signal is updated in M equal steps, the new signal is given by $$f(t_{i+1}) = f(t_i) + M \, df_i, \quad (11)$$

where $df_i$ is the signal increment at each step.

Figure 6:
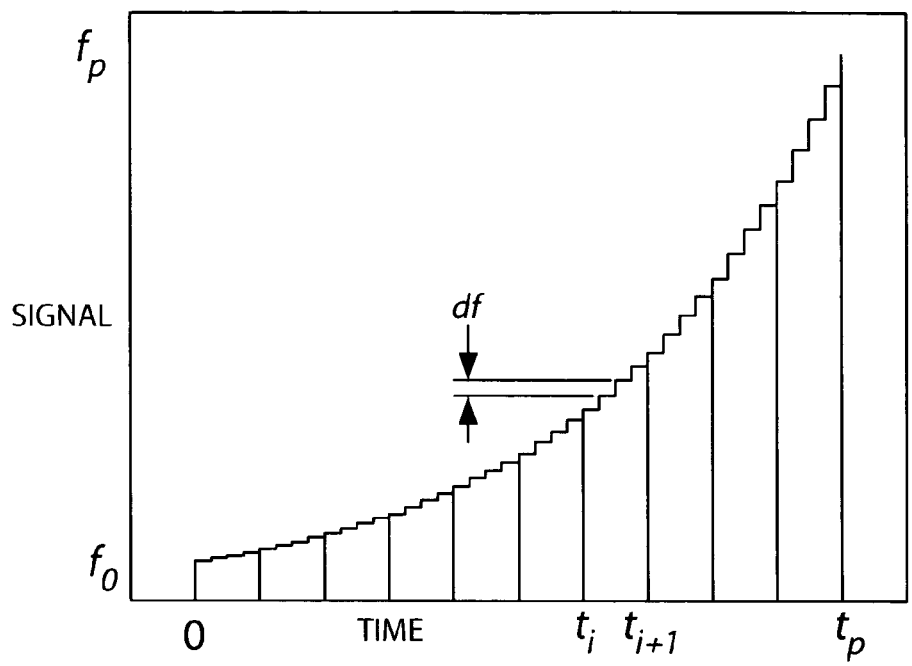
FIG. 6 is a graph of an exemplary exponential signal generated in accordance with certain aspects of the present invention.

FIG. 6 shows an example the output from the signal generator as a function of time. In this example, M=4, so there are four steps in each time segment (the $i^{th}$ time segment is taken as the time interval between $t_i$ and $t_{i+1}$). The number of steps in the curve is usually much higher in practice, but a small number of steps have been depicted in the figure for clarity. In FIG. 6, $\alpha$ is greater than one and the signal increases with time. When $\alpha$ is less than one, the signal decreases with time. From a comparison of FIG. 6 and FIG. 1, it is clear that, for an equal number of segments, the curve in FIG. 6 provides a better approximation to the desired signal. However, for an equal number of steps, the curve in FIG. 1 will provide a better approximation to the desired signal.

By comparing equations 6 and 11, the signal increment in the $i^{th}$ time segment is $$df_i = \frac{k \cdot f(t_i)}{M}, \quad (12)$$

and, using equation 6, $$df_i = \frac{k \cdot f(t_i)}{M} = \frac{k(1+k) \cdot f(t_{i-1})}{M} = df_{i-1} + k \cdot df_{i-1}, \quad (13)$$

where $$df_0 = \frac{k \cdot f_0}{M}. \quad (14)$$

Equation 12 indicates that the increment signal df is also an exponential signal, since it is proportional to the exponential signal f. Equation 13 shows that df can be generated recursively in the same way as f, while equation 14 shows how df is initialized.

Figure 7:
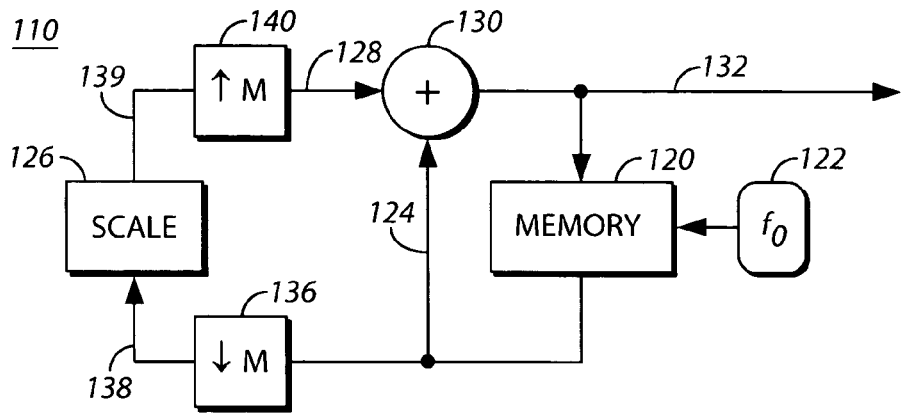
FIG. 7 is a functional diagram of an exponential signal generator in accordance with certain aspects of the present invention.

Equations 11 and 12 and equations 11, 13 and 14 provide two related methods for generating the exponential signal. FIG. 7 is a functional block diagram of an exponential signal generator that operates in accordance with equations 11 and 12. In FIG. 7, a memory unit 120 stores the signal $f(t_i)$. Initially, the value $f_0$ (122) is stored in memory unit 120. In each cycle of operation, the increment signal df (128) is added to the signal 124 in adder 130 to produce the next exponential signal $f(t_{i+1})$ (132). The signal 132 is then stored in memory unit 120, replacing the previous value in the memory unit. In every $M^{th}$ cycle, as denoted by the down-sampler or decimator 136, the decimated signal 138 is scaled by a factor k/M in scale unit 126 to produce a scaled signal 139, which is passed to up-sampler or interpolator 140. The up-sampler operates by repeating the scaled signal 139 until a new scaled signal is produced.

When M=1, FIG. 6 and FIG. 7 are equivalent.

Figure 8:
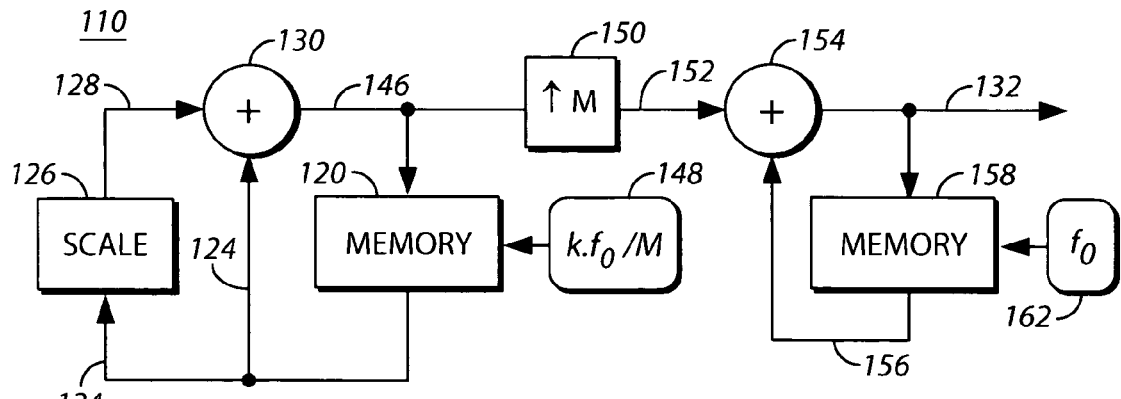
FIG. 8 is a functional diagram of an exponential signal generator in accordance with certain aspects of the present invention.

FIG. 8 is a functional block diagram of an exponential signal generator that operates in accordance with equations 11, 13 and 14. In FIG. 8, a memory unit 120 stores the signal $df(t_i)$. Initially, the value $kf_0/M$ (148) is stored in memory unit 120. In each cycle of operation, the signal $df(t_i)$ (124) is scaled by a factor k in scale unit 126 to produce scaled signal 128. The scaled signal 128 is added to the signal 124 in adder 130 to produce the next increment signal $df(t_{i+1})$ (146). The signal 146 is then stored in memory unit 120, replacing the previous value in the memory unit. The increment signal $df(t_{i+1})$ (146) is passed to up-sampler 150, which increases the sample rate of the signal by repeating each sample M times to obtain a higher sample rate signal 152. The higher sample rate signal 152 is added in adder 154 to a signal 156 obtained from a memory unit 158. The result of the addition is the output exponential signal 132. This signal 132 is placed in memory unit 158, replacing the previous value in the memory unit. Initially, the value $f_0$ (162) is stored in the memory unit.

In FIG. 7 and FIG. 8, the scale unit 126 may be implemented as a multiplier, a shifter or a shifter and an inverter.

Below is a pseudo code listing of an exemplary method for generating an exponential signal using equations 11, 13 and 14.

```
count_1 = N_sweep         // number of segments left in sweep
count_2 = N_clock         // number clocks per segment period
count_3 = M               // number of steps left in segment
f = f_0                   // start frequency
df = k * f_0 / M          // increment for first segment
while count_1 > 0         // while sweep not finished
  while count_3 > 0       // while segment not finished
    while count_2 > 0     // clock counter not expired
      count_2 = count_2 - 1   // clock counter
      if count_2 = 0          // end of period
        count_3 = count_3 - 1   // step counter
        f = f + df              // update frequency
        if count_3 = 0          // end of segment
          df = df + k*df        // new step size
          count_1 = count_1 - 1
        endif
      endif
    end while
    count_2 = N_clock   // reset clock counter
  end while
  count_3 = M           // reset increment counter
end while
```

In this example implementation, $N_{clock}=T/(M.T_{clock})$ and $N_{sweep}=t_p/T$.

Figure 9:
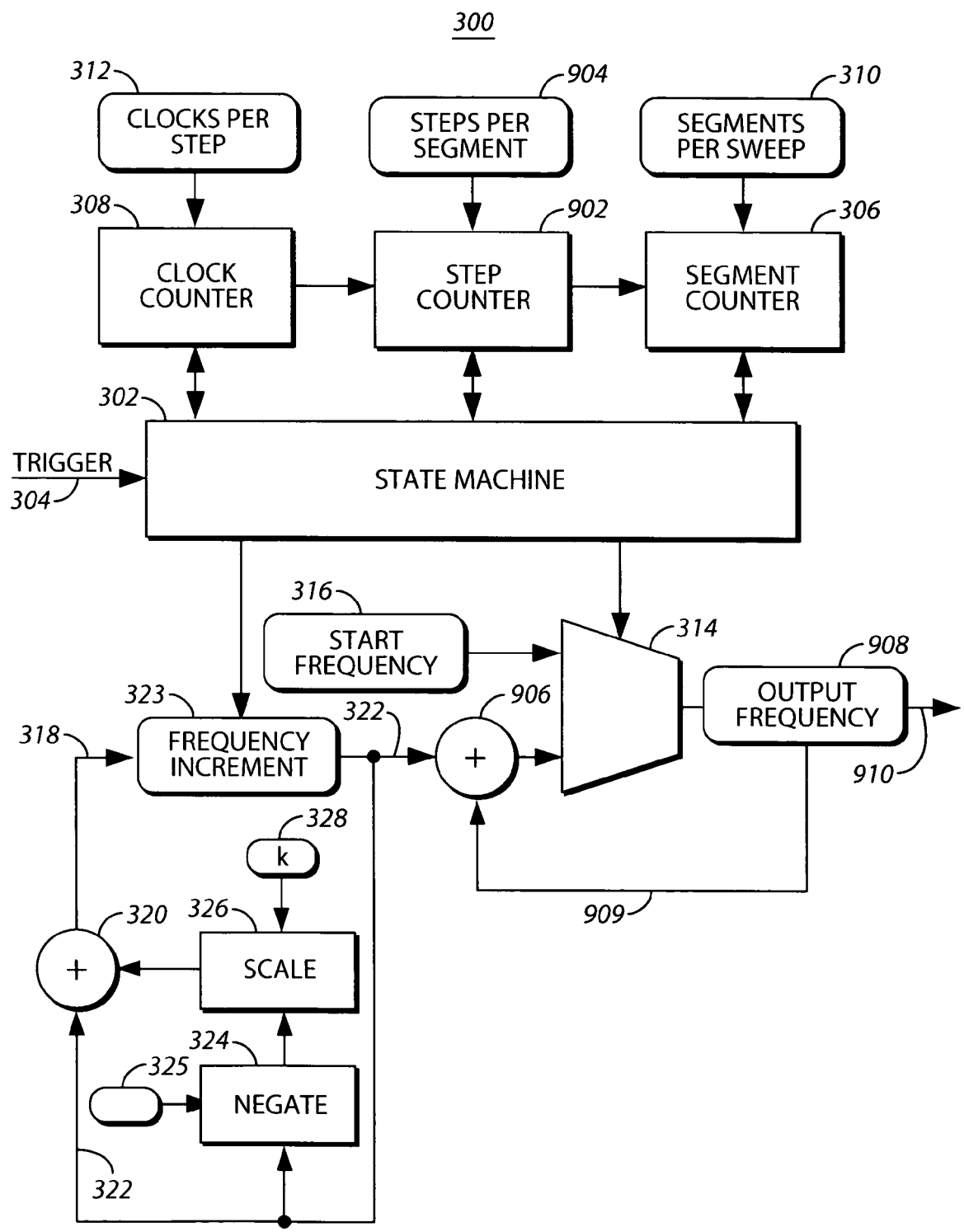
FIG. 9 is a diagrammatic representation of an exponential signal generator in accordance with certain aspects of the present invention.

FIG. 9 is a diagram of an embodiment of an exponential signal generator 300 that operates according to the method described above. Referring to FIG. 9, the system 300 is controlled by a state machine 302. The operation of the state machine 302 is initiated by trigger 304. The state machine 302 is responsive to three counters, a segment counter 306, denoted by count_1 in the pseudo code above, a clock counter 308, denoted by count_2 in the pseudo code above, and a step counter 902, denoted by clock_3 in the pseudocode above. When the clock and step counters expire, they are reset to values in memory circuits 310, 312 and 904 respectively. The step counter may be initialized to a value less than the number of memory circuit 310 to allow for a total sweep time that is not a complete number of segments. Memory circuit 310 holds the value $N_{sweep}=t_p/T$, while memory circuit 312 holds the value $N_{clock}=t_p/(M.T_{clock})$. Memory circuit 904 holds the value M. The state machine controls the operation of multiplexer 314. At the beginning of a sweep, the multiplexer is configured to select the start value $f_0$, from memory circuit 316. Thereafter, the multiplexer is configured to select the output from adder 906. The output from the multiplexer 314 is stored in memory 908 and provides the current output signal 910, which may, for example, be passed to a signal generator to control the frequency of a test signal. Whenever the clock counter 308 expires, the previous output signal 909 is passed to adder 906 where it is added to the increment signal 322. Adder 906 and memory 908 operate as an accumulator or integrator, accumulating the exponential increment signal 322. The increment signal 322 is passed to inverter 324 which negates or passes the signal dependent upon a control value stored in memory 325. The signal is then passed to scale unit 326. The inverter 324 only negates the signal when the frequency is specified to decrease with time (i.e. when k is negative). When the signal increases with time, the inverter is bypassed and the signal is passed directly to scale unit 326. In one embodiment of the signal generator, the scale unit 326 may be a multiplier, which multiples the frequency signal by the value k. In this embodiment, the inverter 324 may not be required. In a further embodiment of the system, the scale unit is a shifter and the scale factor is $k=\pm 2^{-S}$. The scaling is achieved by shifting the signal down by S binary places. The output from the scale unit 326 is added to the increment signal 322 in adder 320, to provide the next increment signal 318. The increment signal is only updated when the step counter 902 expires. When the segment counter 306 expires, the state machine 302 halts the operation of the system. In an alternative embodiment, the segment counter 306 is replaced by a second step counter, and the memory 310 holds the total number of steps for the sweep. The first step counter 902 is reset every segment, while the second step counter is reset only in preparation for a new sweep.

Figure 10:
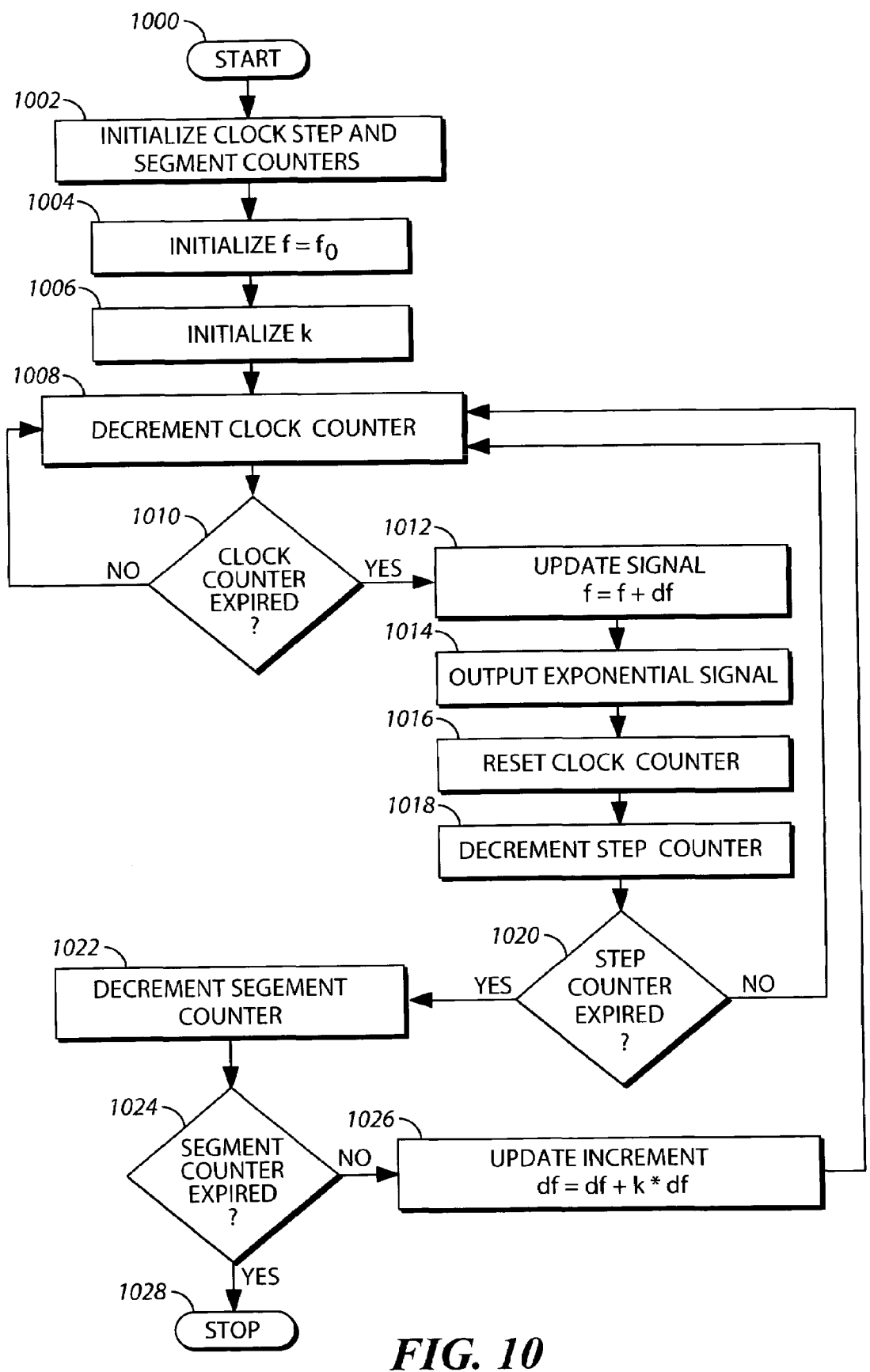
FIG. 10 is a flow chart of a further method for generating an exponential signal in accordance with certain aspects of the present invention.

FIG. 10 is a flow chart of an exemplary method for generating an exponential signal using a number of equal increments within each time segment. Following start block 1000 in FIG. 10, the clock, step and segment counters are initialized at block 1002. The start value $f_0$ and the scale factor k are initialized at blocks 1004 and 1006 respectively. At each clock cycle, the clock counter is decremented at block 1008. At decision block 1010 a check is made to determine if the clock counter has expired, indicating that a period of time T has elapsed. If the clock counter has not expired, as indicated by the negative branch from decision block 1010, flow returns to block 1008 and the counter is decremented again at the next clock cycle. If the clock counter has expired, as indicated by the positive branch from decision block 1010, the signal is updated at block 1012 and output (to control a test signal generator, for example) at block 1014. The clock counter is then reset at block 1016 to indicate the start of a new period, and the step counter is decremented at block 1018 to indicate that another signal value has been generated within the current time segment. At decision block 1020, a check is made to determine if the step counter has expired. If not, as indicated by the negative branch from decision block 1020, flow returns to block 1008. If the step counter has expired, as indicated by the positive branch from decision block 1020, the segment counter is decremented at block 1022 to indicate that another time segment has been completed. At decision block 1024 a check is made to determine if the segment counter has expired. If not, as indicated by the negative branch from decision block 1024, the increment signal, df, is updated at block 1026 and flow returns to block 1008. If the segment counter has expired, as indicated by the positive branch from decision block 1024, signal sweep is complete and the process terminates at block 1028.

Figure 11:
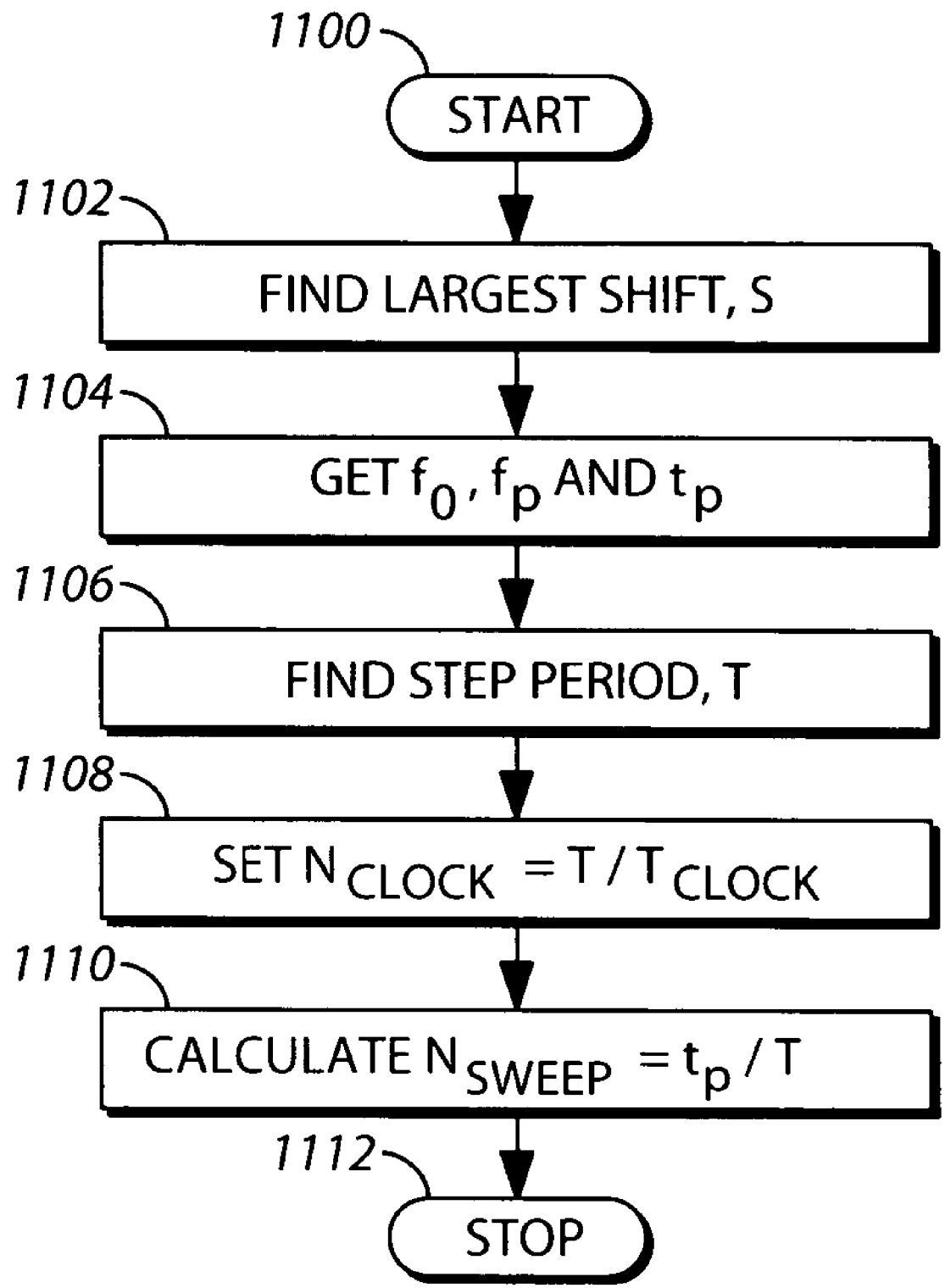
FIG. 11 is a flow chart of a method for initializing an exponential signal generator in accordance with certain aspects of the present invention.

FIG. 11 is a flow chart of an exemplary method for initializing an exponential signal generator. Following start block 1100, the maximum shift value is determined at block 1102 using a selected range of values for the sweep parameters. From equation 9, the time step has duration $$T = t_p \cdot \frac{\ln(1 \pm 2^{-S})}{\ln(f_p) - \ln(f_0)}. \quad (15)$$

For a particular implementation of an exponential signal generator, there is a minimum value of T determined by the hardware. This value is denoted by $T_{min}$. For $f_p > f_0$, this gives a requirement $$T_{min} < t_p \cdot \frac{\ln(1 + 2^{-S})}{\ln(f_p/f_0)}. \quad (16)$$

Rearranging this equation gives $$2^{-S} > \left(\frac{f_p}{f_0}\right)^{\frac{T_{min}}{t_p}} - 1, \quad (17)$$

or, $$S < -\log_2\left\{\left(\frac{f_p}{f_0}\right)^{\frac{T_{min}}{t_p}} - 1\right\}. \quad (18)$$

The most severe constraint on S is when $f_p/f_0$ is at maximum and when $t_p$ is at a minimum, hence $$S_{min} < -\log_2\left\{\left(\left[\frac{f_p}{f_0}\right]_{max}\right)^{\frac{T_{min}}{[t_p]_{min}}} - 1\right\}. \quad (19)$$

The minimum value $S_{min}$ is taken as the largest integer value for which equation 19 holds. The selected range of sweep parameters may be predetermined, or selected by a user via a user interface.

The sweep range may be separated as a number of contiguous sub-ranges, so that within each range the ratio $f_p/f_0$ is reduced. A different shift value S and/or a different time step T may be used in each sub-range to provide greater accuracy.

Referring again to FIG. 11, the desired sweep parameters $f_0$, $f_p$ and $t_p$ are obtained at block 1104 and the step period T is calculated at block 1106 as $$T = t_p \cdot \frac{\ln(1 + 2^{-S_{min}})}{\ln(f_p) - \ln(f_0)}. \quad (20)$$

The number of clock cycles for each step is calculated at block 1108 as $N_{clock} = T/T_{clock}$, and the number of steps in the complete signal sweep is calculated at block 1110 as $N_{sweep} = t_p/T$. The setup process is completed at block 1112.

Figure 12:
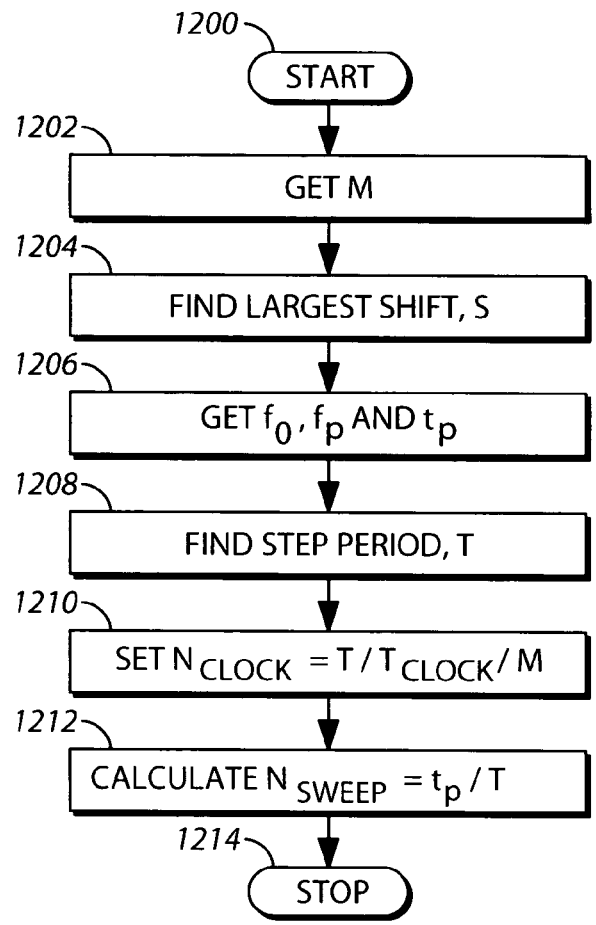
FIG. 12 is a flow chart of a further method for initializing an exponential signal generator in accordance with certain aspects of the present invention.

FIG. 12 is a flow chart of a method for initializing an exponential signal generator that uses equal signal increments within each time segment. Following start block 1200, the value M is obtained at block 1202 (this value may be predetermined or set by a user via a user interface, for example). The maximum shift value is determined at block 1204 using a selected range of values for the sweep parameters. This process is described above with reference to FIG. 11, however, the minimum step time may depend upon the number of steps in each segment. The desired sweep parameters $f_0$, $f_p$ and $t_p$ are obtained at block 1206 and the step period T is calculated at block 1208 as $$T = t_p \cdot \frac{\ln(1 + 2^{-S_{min}})}{\ln(f_p) - \ln(f_0)}. \quad (21)$$

The number of clock cycles for each step is calculated at block 1210 as $N_{clock} = T/(M \cdot T_{clock})$, and the number of segments in the complete signal sweep is calculated at block 1212 as $N_{sweep} = t_p/T$. The setup process is completed at block 1214.

Figure 13:
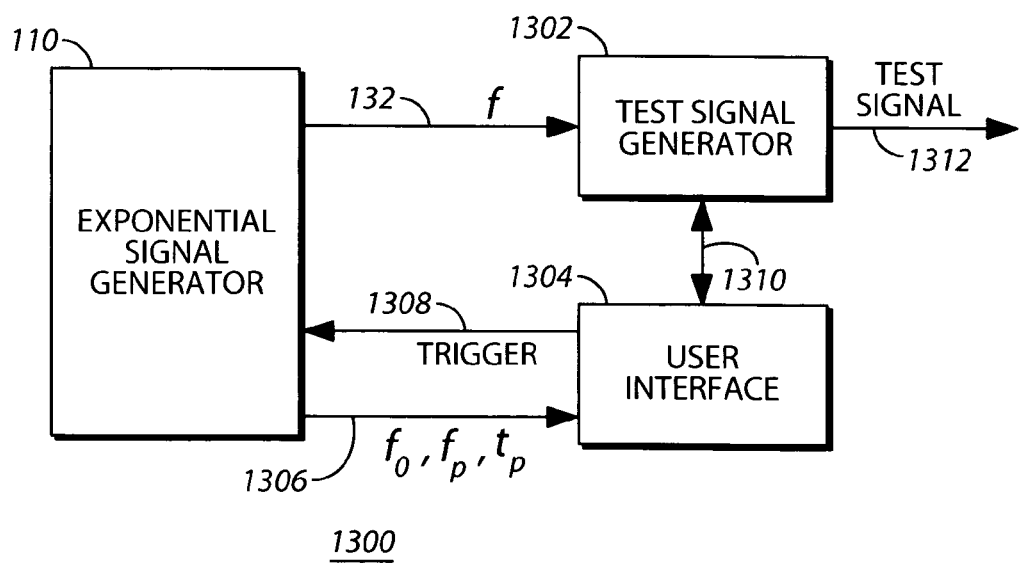
FIG. 13 is a diagrammatic representation of a logarithmic sweep generator incorporating an exponential signal generator in accordance with certain aspects of the present invention.

A logarithmic sweep generator 1300 incorporating an exponential signal generator is shown in FIG. 13. Referring to FIG. 13, a test signal generator 1302 receives an exponential signal 132 from the exponential signal generator 110. The exponential signal is used to control the frequency or period of a test signal 1312 generated by the test signal generator. A user interface 1304 is operable to receive sweep parameters from a user. Alternatively, the sweep parameters could be passed to the logarithmic sweep generator from a host computer. The sweep parameters 1306, which include the initial and final values of the exponential signal and the duration of the sweep, are passed to the exponential signal generator 110. The sweep is initiated by a trigger signal 1308 which is also passed to the exponential signal generator 110. The user interface 1304 is also coupled to the test signal generator 1302 and is used to control parameters such as the type of waveform to be generated and the amplitude of the test signal.

Those of ordinary skill in the art will recognize that the present invention has been described in terms of exemplary embodiments based upon use of a programmable gate array. However, the invention should not be so limited, since the present invention could be implemented using hardware component equivalents such as special purpose hardware and/or dedicated processors, which are equivalents to the invention as, described and claimed. Similarly, general purpose computers, microprocessor based computers, digital signal processors, microcontrollers, dedicated processors, custom circuits, ASICS and/or dedicated hard wired logic may be used to construct alternative equivalent embodiments of the present invention.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An exponential signal generator comprising:
   a first memory for storing a first exponential value;
   a scale unit coupled to the first memory to receive the first exponential value and produce a scaled value; and a first adder coupled to the first memory and the scale unit to add the first exponential value and the scaled value to produce a new first exponential value for storing in the first memory.

2. An exponential signal generator in accordance with claim 1, wherein the scale unit comprises a multiplier.

3. An exponential signal generator in accordance with claim 1, wherein the scale unit comprises a shifter.

4. An exponential signal generator in accordance with claim 3, wherein the scale unit further comprises a means for negating the first exponential value.

5. An exponential signal generator in accordance with claim 1, further comprising a state machine operable to control the first memory, the scale unit and the first adder.

6. An exponential signal generator in accordance with claim 5, further comprising:
a system clock; and
a clock counter operable to count cycles of the system clock, wherein the state machine is responsive the clock counter and controls the first adder to operate one in every time step of $N_{clock}$ cycles of the system clock.

7. An exponential signal generator in accordance with claim 6, further comprising a segment counter operable to count time segments, wherein the state machine is responsive the segment counter and terminates operation of the exponential signal generator once $N_{sweep}$ time segments have elapsed.

8. An exponential signal generator in accordance with claim 6, further comprising a first step counter operable to count time steps, wherein the state machine is responsive the first step counter and controls the scale unit to operate once in every M time steps.

9. An exponential signal generator in accordance with claim 8, further comprising a second step counter operable to count time steps, wherein the state machine is responsive the second step counter and terminates operation of the exponential signal generator once a specified number of time steps have elapsed.

10. An exponential signal generator in accordance with claim 5, further comprising:
a second memory for storing a second exponential value;
a second adder coupled to the second memory and operable to add the second exponential value and the first exponential value to produce a new second exponential value.

11. An exponential signal generator in accordance with claim 10, further comprising a segment counter operable to count time segments, wherein the state machine is responsive the segment counter and terminates operation of the exponential signal generator once $N_{sweep}$ time segments have elapsed.

12. An exponential signal generator in accordance with claim 5, further comprising:
a system clock;
a clock counter operable to count cycles of the system clock;
a step counter operable to count time steps; and wherein the state machine is responsive the clock counter and step counter and controls the second adder to operate once in every time step of $N_{clock}$ cycles of the system clock and controls the first adder and scale unit to operate once in every M time steps.

13. An exponential signal generator in accordance with claim 1, further comprising: a test signal generator operable to produce a test signal having a frequency proportional to the first exponential value.

14. An exponential signal generator in accordance with claim 13, further comprising a user interface operable to receive an initial exponential value $f_0$ a final exponential value $f_p$ and a duration of operation $t_p$ of the exponential signal generator from a user.

15. An exponential signal generator comprising:
a means for retrieving an exponential value representative of an exponential signal;
means for scaling the exponential value by a scale factor to produce a scaled value, said means for scaling comprising a hardware component coupled to said means for retrieving, said means for calculating comprising a hardware components coupled to said means for retrieving and said means for scaling;
means for calculating a sum of the exponential value and the scaled value; and
a means for storing the sum of the exponential value and the scaled value as a new first exponential value.

16. An exponential signal generator in accordance with claim 15, wherein the means for scaling the exponential value comprises a means for shifting the exponential value by S binary places.

17. An exponential signal generator in accordance with claim 16, wherein the means for scaling the exponential value further comprises a means for negating the exponential value.

18. An exponential signal generator in accordance with claim 16, further comprising a means for adjusting the rate of operation of the exponential signal generator.

19. An exponential signal generator in accordance with claim 18, wherein the means for adjusting the rate of operation of the exponential signal generator is dependent upon the initial and final values of the exponential signal, the duration of the exponential signal and the shift value S.

20. An exponential signal generator in accordance with claim 16, wherein the means for scaling has a lower rate of operation than means for calculating.

21. An exponential signal generator in accordance with claim 15, further comprising a means for negating the scaled value.

22. An exponential signal generator in accordance with claim 15, further comprising a means for determining the scale factor dependent upon an initial exponential value $f_0$ a final exponential value $f_p$ and a duration of operation $t_p$ of the exponential signal generator.

23. An exponential signal generator in accordance with claim 22, wherein the scale factor is $$k = \left(\frac{f_p}{f_0}\right)^{\frac{T}{t_p}} - 1,$$

wherein T is the step time of the exponential signal generator.

24. An exponential signal generator in accordance with claim 22, further comprising a means for generating a test signal having a frequency proportional to the exponential value.

25. An exponential signal generator in accordance with claim 22, further comprising a means for generating a test signal having a fundamental period proportional to the exponential value.

* * * * *

UNITED STATES PATENT AND TRADEMARK OFFICE
CERTIFICATE OF CORRECTION

PATENT NO.       : 7,249,154 B2                                       Page 1 of 1
APPLICATION NO.  : 10/685317
DATED            : July 24, 2007
INVENTOR(S)      : Gao et al.

It is certified that error appears in the above-identified patent and that said Letters Patent is hereby corrected as shown below:

In column 11, line 20, in Claim 6, delete "one" and insert -- once --, therefor.

In column 12, line 3, in Claim 14, delete "$f_0$" and insert -- $f_0$, --, therefor.

In column 12, line 45, in Claim 22, delete "$f_0$" and insert -- $f_0$, --, therefor.

Signed and Sealed this

Eighteenth Day of December, 2007

JON W. DUDAS
*Director of the United States Patent and Trademark Office*